United States Patent
Tanaka

(10) Patent No.: US 9,903,760 B2
(45) Date of Patent: Feb. 27, 2018

(54) RESIN IDENTIFICATION DEVICE

(71) Applicant: SHIMADZU CORPORATION, Kyoto (JP)

(72) Inventor: Toyohiko Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 114 days.

(21) Appl. No.: 14/989,806

(22) Filed: Jan. 7, 2016

(65) Prior Publication Data

US 2016/0223401 A1    Aug. 4, 2016

(30) Foreign Application Priority Data

Jan. 30, 2015  (JP) ................................. 2015-016595

(51) Int. Cl.
| | |
|---|---|
| *G01J 3/42* | (2006.01) |
| *G01J 3/453* | (2006.01) |
| *G01J 3/10* | (2006.01) |
| *G01J 3/02* | (2006.01) |

(52) U.S. Cl.
CPC ........... *G01J 3/4535* (2013.01); *G01J 3/0216* (2013.01); *G01J 3/108* (2013.01); *G01J 3/42* (2013.01); *G01J 2003/425* (2013.01)

(58) Field of Classification Search
CPC .................................................. G01J 3/4535
See application file for complete search history.

(56) References Cited

U.S. PATENT DOCUMENTS

2008/0278719 A1* 11/2008 Fairchild ................... G01J 3/44
356/301

FOREIGN PATENT DOCUMENTS

| JP | 2010060312 A | * 3/2010 | ............. G01N 21/90 |
|---|---|---|---|
| WO | 2012/147717 | 11/2012 | |

\* cited by examiner

*Primary Examiner* — David Porta
*Assistant Examiner* — Jeremy S Valentiner
(74) *Attorney, Agent, or Firm* — JCIPRNET

(57) ABSTRACT

A resin identification device capable of measuring samples having various shapes is provided. The resin identification device includes a Fourier transform infrared spectrophotometer (FTIR), and sample placing plates 31 and 32 having an opening 33. The FTIR includes: an infrared light source section 10, irradiating a sample S with infrared light; an infrared light detection section 20, detecting light intensity information of the infrared light reflected from the sample S; and a control section 50, obtaining the light intensity information. By replacement of the sample S in a predetermined position so as to block off the opening 33, the infrared light source section 10 irradiates infrared light on a lower surface of the sample S, and the infrared light detection section 20 detects the light intensity information of the infrared light reflected by the lower surface of the sample S.

4 Claims, 6 Drawing Sheets

RESIN IDENTIFICATION DEVICE

CROSS-REFERENCE TO RELATED APPLICATIONS

This application claims the priority benefit of Japan application serial no. 2015-016595, filed on Jan. 30, 2015. The entirety of the above-mentioned patent application is hereby incorporated by reference herein and made a part of this specification.

BACKGROUND OF THE INVENTION

Field of the Invention

The invention relates to a resin identification device, particularly to a resin identification device using an infrared spectrophotometer (for example, a Fourier transform infrared spectrophotometer, hereinafter abbreviated as "FTIR") for an identification section.

Description of the Related Art

A Michelson two-beam interferometer utilized for an FTIR has a configuration in which infrared light emitted from an infrared light source is divided by a beam splitter in two directions toward a stationary mirror and a movable mirror, and the infrared light reflected back from the stationary mirror and the infrared light reflected back from the movable mirror are combined by the beam splitter and sent along one optical path. At this moment, when the movable mirror is moved back and forth in an incident light axial direction, a difference in optical path length between the two light beams obtained by the division changes. Therefore, the combined light becomes interference light (interferogram) of which intensity changes according to the position of the movable mirror.

Such interference light is irradiated on a surface of a sample, and a wavelength of the light reflected by the surface of the sample is investigated using an infrared detector. Thereby, a component analysis of the sample is carried out.

FIG. 4 is a plan view illustrating a configuration of a conventional FTIR; FIG. 5 is a side view of the FTIR shown in FIG. 4. Moreover, a direction horizontal to the ground is referred to as direction X, a direction horizontal to the ground and perpendicular to the direction X is referred to as direction Y, and a direction perpendicular to both the directions X and Y is referred to as direction Z.

An FTIR 100 includes: an infrared light source section 110 that emits infrared light, an infrared light detection section 120, a sample arrangement section 130 where a sample S is arranged, and a control section 150.

The infrared light source section 110 includes: an infrared light source 12 that emits infrared light, a main interferometer principal part 40 that produces an interferogram, plane mirrors 13 and 14, and a parabolic mirror (condensing mirror) 111. The infrared light emitted from the infrared light source 12 is irradiated to a beam splitter 42 of the main interferometer principal part 40 via the plane mirrors 13 and 14.

In the main interferometer principal part 40, a movable mirror unit 41 including a movable mirror 41a, the beam splitter 42, and a stationary mirror unit 43 including a stationary mirror 43a are arranged. According to such a main interferometer principal part 40, the infrared light emitted from the infrared light source 12 is irradiated to the beam splitter 42 by which the infrared light is divided in two directions toward the movable mirror 41a and the stationary mirror 43a. Then, the infrared light reflected by the movable mirror 41a and the infrared light reflected by the stationary mirror 43a are returned to the beam splitter 42, combined by the beam splitter 42, and sent to the parabolic mirror 111 via the plane mirrors 13 and 14. At this moment, since the movable mirror 41a moves back and forth reciprocally in an incident light axial direction M, the difference in optical path length between the two light beams obtained by the division changes periodically, and the light heading from the beam splitter 42 to the parabolic mirror 111 becomes an interferogram in which an amplitude varies over time.

The infrared light detection section 120 includes: an infrared detector 21 that detects the interferogram (infrared light), and two parabolic mirrors (condensing mirrors) 122 and 23.

The sample arrangement section 130 is arranged in a position corresponding to a lower part of the FTIR 100. The sample arrangement section 130 has a platelike body. In a side view, the parabolic mirror 111 is provided in the upper left direction of the platelike body for reflecting light to the lower right direction, and the parabolic mirror 122 is provided in the upper right direction of the platelike body for reflecting the light from the lower left direction. Accordingly, as shown in FIG. 6A, when the sample S is placed in a position (measurement position) on an upper surface of the platelike body, the light collected by the parabolic mirror 111 is irradiated at a measurement point on an upper surface of the sample S, and the light reflected by the measurement point on the upper surface of the sample S is formed into parallel light by the parabolic mirror 122, such that the parallel light is collected to the infrared detector 21 by the parabolic mirror 23.

In addition, for reuse of a resin product (resin piece), it is necessary to identify the type of resin (e.g., polypropylene (PP), polystyrene (PS), or acrylonitrile butadiene styrene (ABS), etc.). A system that utilizes infrared spectroscopy to sequentially measure resin pieces so as to determine the type of resin has been manufactured and marketed (e.g., see Patent Document 1).

In one example thereof, the sample arrangement section 130 that is capable of sequentially arranging resin pieces S in predetermined positions includes: a disc-shaped table 134 that has a central part and a peripheral part, a driving mechanism (not illustrated) that rotates the disc-shaped table 134 with the central part of the disc-shaped table 134 as the axis of rotation, and a laser sensor (sample trigger function) 135 for detecting that the resin pieces S are in the predetermined positions. Moreover, data detected by the laser sensor 135 is sent to the control section 150.

According to such a sample arrangement section 130, after a plurality of resin pieces S (the first resin piece S1, the second resin piece S2, . . . ) are placed on the peripheral part of the disc-shaped table 134, the disc-shaped table 134 is rotated clockwise at a predetermined speed by the driving mechanism, thereby sequentially arranging the resin pieces S in the predetermined positions in a manner that the first resin piece S1 is arranged in its predetermined position when a predetermined time elapses after the laser sensor 135 has detected the first resin piece S1, then the second resin piece S2 is arranged in its predetermined position when a predetermined time elapses after the laser sensor 135 has detected the second resin piece S2, and so on.

The control section 150 includes: a light intensity information obtaining part that obtains light intensity information (reflected light intensity) from the infrared detector 21, an information obtaining part that obtains information regarding presence or absence of a sample from the laser sensor 135, and a sample measurement part that produces an absorption spectrum of the first resin piece S1 or an absorption spectrum of the second resin piece S2 based on the obtained light intensity information and information regarding presence or absence of the sample.

PRIOR-ART DOCUMENTS

Patent Documents

Patent Document 1: WO 2012/147717

SUMMARY OF THE INVENTION

Nevertheless, in the FTIR 100 as described above, since the light collected by the parabolic mirror 111 is irradiated on the upper surface of the sample S, and the light reflected by the upper surface of the sample S is collected to the infrared detector 21 by the parabolic mirrors 122 and 23, there is a problem that only the sample S having a predetermined shape can be measured. For example, as shown in FIG. 6B, for a sample Sa greater in height than the sample S having the predetermined shape, since the light from the parabolic mirror 111 is irradiated on an upper surface of the sample Sa before being collected, defocus is caused so that only a small amount of the light reaches the infrared detector 21. In addition, as shown in FIG. 6C, for a sample Sb having non-parallel upper and lower surfaces, when the light collected by the parabolic mirror 111 is irradiated on the upper surface of the sample Sb, the light reflected by the upper surface of the sample Sb may be diverted and prevented from reaching the parabolic mirror 122.

In order to solve the above problems, the inventor of the present application has earnestly studied a resin identification device capable of measuring samples having various shapes (variable shape), and therefore discovered an approach of measuring the lower surface, rather than the upper surface, of the sample. Accordingly, an opening is formed in a sample placing plate, and the sample is placed so as to block off the opening. Consequently, the problem regarding the height of the sample is solved, and the problem regarding the sample having non-parallel upper and lower surfaces can also be solved.

That is, the resin identification device of the invention includes an FTIR, and a sample placing plate provided with an opening, wherein the FTIR includes: an infrared light source section that irradiates infrared light to a sample being resin, an infrared light detection section that detects light intensity information of the infrared light reflected from the sample, and a control section that obtains the light intensity information. By placement of the sample in a predetermined position so as to block off the opening, the infrared light source section irradiates infrared light on the lower surface of the sample, and the infrared light detection section detects the light intensity information of the infrared light reflected by the lower surface of the sample.

Herein, the term "predetermined position" refers to a position where the infrared light is irradiated from the infrared light source section and where the reflected infrared light is sent to the infrared light detection section, and is determined in advance by the designer or the like of the resin identification device.

As described above, according to the resin identification device of the invention, light having sufficient intensity is efficiently collected and accurate measurement can be achieved regardless of shape or size of the sample.

(Means for Solving Other Problems and Effects Thereof)

In addition, in the invention, the infrared light source section has a condensing mirror, and irradiates infrared light from the condensing mirror to the measurement point on the lower surface of the sample. The infrared light detection section has a condensing mirror, and collects the infrared light reflected by the measurement point on the lower surface of the sample to a detector. Thereby, the reflected light intensity of the sample is obtained.

According to the resin identification device of the invention, the infrared light from the infrared light source section passes through the opening so as to be irradiated at the measurement point on the lower surface of the sample, and the light reflected by this measurement point passes through the opening so as to be guided to the infrared light detection section.

In the invention, the sample placing plate is movable in a predetermined direction. When the sample is continuously or intermittently placed on the sample placing plate, the control section controls to emit infrared light continuously to obtain the light intensity information so as to determine whether the sample is in the predetermined position from a light intensity change per period of time.

According to the resin identification device of the invention, when the sample is not present in the predetermined position, the infrared light that has passed through the opening will not be reflected by the sample placing plate and so on, and the intensity of light received by the infrared detector becomes almost zero. Therefore, there will be an obvious difference between data (light intensity information) obtained when the sample is present in the predetermined position and that obtained when the sample is not present in the predetermined position. Accordingly, even if samples are to be sequentially arranged in predetermined positions, without provision of a laser sensor or the like for detecting the arrangement of the samples into the predetermined positions, the control section is able to identify the measurement data (light intensity information) from the first sample and that from the second sample from the light intensity change per period of time.

Furthermore, in the invention, the control section controls to emit infrared light continuously to obtain the light intensity information so as to determine whether the sample is in the predetermined position from the light intensity change per period of time, and correlates the sample arranged in the predetermined position at a predetermined time to one of absorption spectrum information.

DESCRIPTION OF EXEMPLARY EMBODIMENTS

The embodiments of the invention are hereinafter described with reference to the drawings. Moreover, the invention is not limited to these embodiments but covers various modifications and variations without departing from the spirit of the invention.

Figure 1:
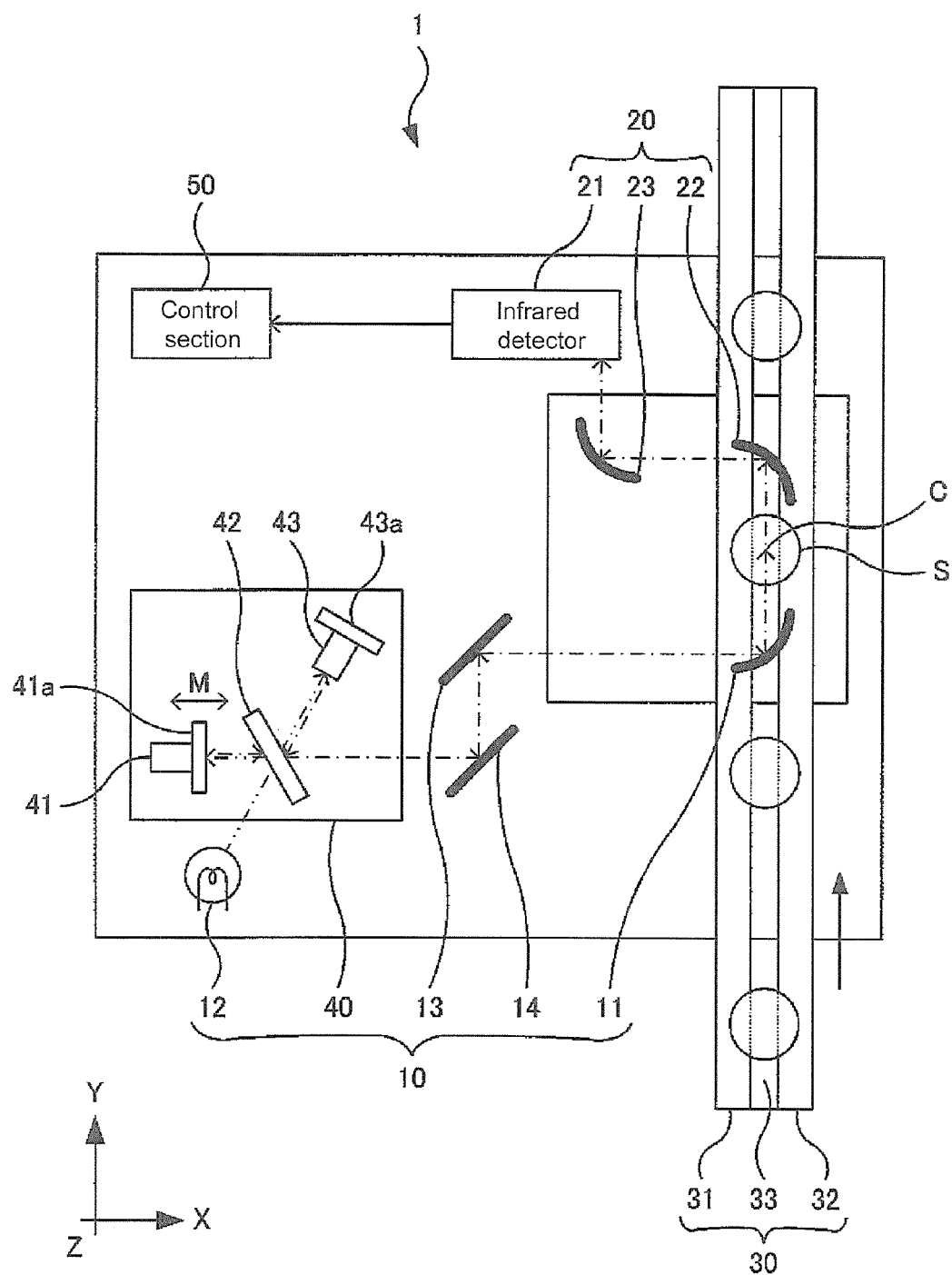
FIG. 1 illustrates a configuration of a resin identification device according to the invention.
Figure 2:
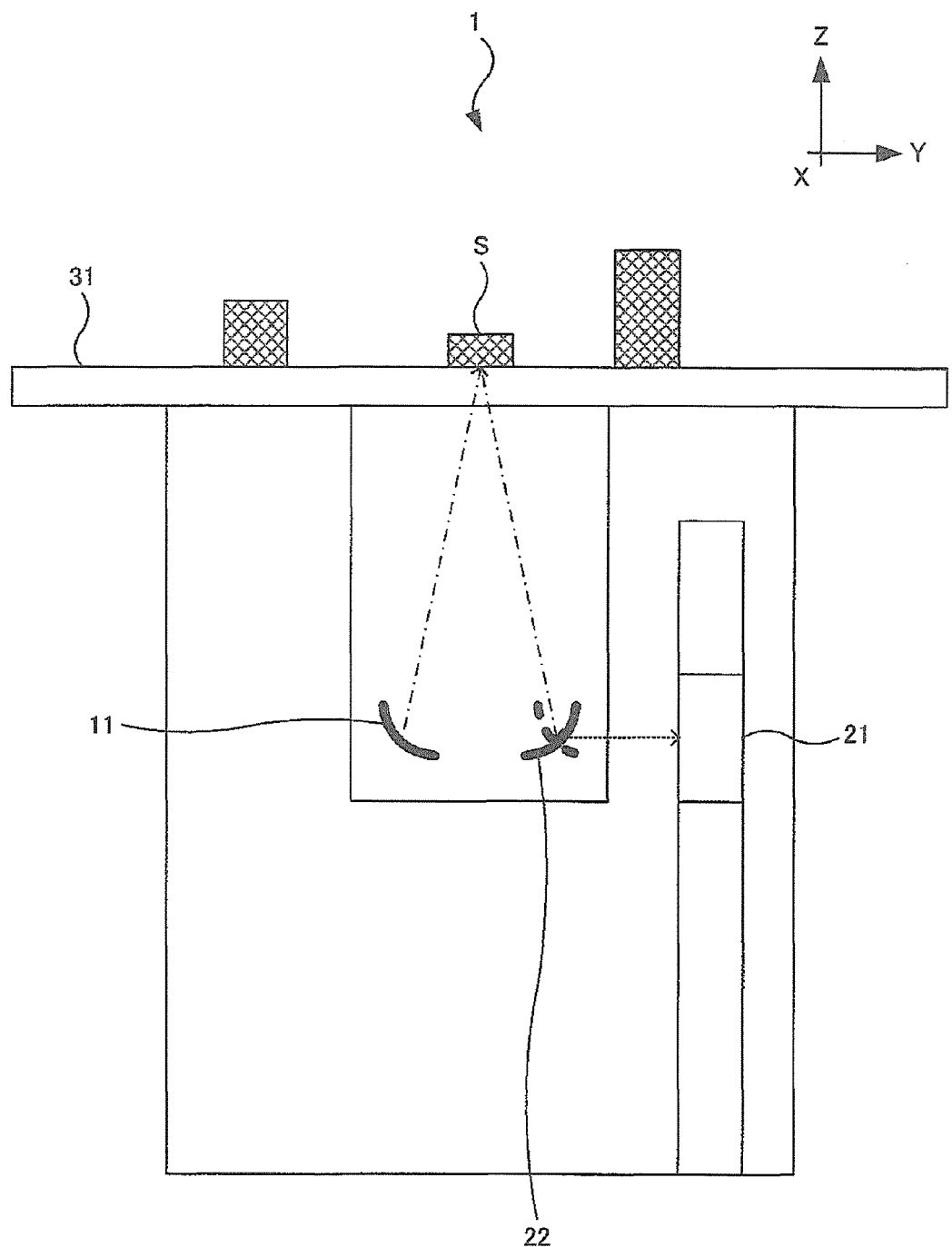
FIG. 2 is a side view of FIG. 1.

FIG. 1 is a plan view illustrating a configuration of a resin identification device according to the invention; FIG. 2 is a side view of the resin identification device shown in FIG. 1. The same elements as those of the aforementioned FTIR 100 are denoted by the same reference numerals, and thus descriptions thereof are omitted.

A resin identification device 1 includes an FTIR, and a sample arrangement section 30 where a resin piece S is arranged, wherein the FTIR includes: an infrared light source section 10 that emits infrared light, an infrared light detection section 20 and a control section 50.

Moreover, the resin piece S in this embodiment is obtained by recycling a waste product (e.g., shredder dust crushed into a size of about 5 to 20 mm) at a recycling factory or the like. For the purpose of reusing the resin piece S as a material for new products, the resin identification device 1 is used to identify the resin piece S by type of resin (e.g., polypropylene (PP), polystyrene (PS), or acrylonitrile butadiene styrene (ABS), etc.).

The sample arrangement section 30 is arranged at an upper part of the resin identification device 1, and includes: two conveying plates (sample placing plates) 31 and 32 arranged in parallel and spaced apart at a predetermined distance by a gap (opening) 33 in the direction X, and a driving mechanism (not illustrated) that moves the two conveying plates 31 and 32 in a predetermined direction (direction Y). As shown in FIG. 1, the left part (a part) of the resin piece S is placed on an upper surface of the conveying plate 31, and the right part (a part) of the resin piece S is placed on an upper surface of the conveying plate 32. Accordingly, a central part (measurement point) C of a lower surface of the resin piece S is arranged at the gap 33 between lower surfaces of the conveying plates 31 and 32.

Moreover, the "predetermined distance" mentioned above refers to a gap size allowing the resin piece S to be placed on the two conveying plates 31 and 32 without falling. This distance is determined in advance by the designer or the like of the resin identification device 1 and is, e.g., 3 mm.

Figure 3A:
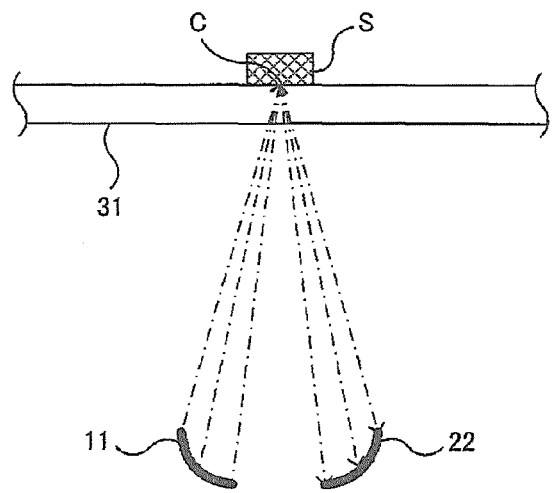
FIGS. 3A to 3C are side views each illustrating a sample arranged in a sample arrangement section of the resin identification device in FIG. 1.

In addition, when viewed from a side, in the lower left direction of the two conveying plates 31 and 32, a parabolic mirror (condensing mirror) 11 for reflecting light to the upper right direction is provided; in the lower right direction of the two conveying plates 31 and 32, a parabolic mirror (condensing mirror) 22 for reflecting the light from the upper left direction is provided. Accordingly, as shown in FIG. 3A, when the resin piece S is arranged in a predetermined position, the light collected by the parabolic mirror 11 passes through the gap 33 between the lower surfaces of the conveying plates 31 and 32 so as to be irradiated at the measurement point C on the lower surface of the resin piece S. The light reflected by the measurement point C on the lower surface of the resin piece S again passes through the gap 33 between the lower surfaces of the conveying plates 31 and 32 so as to be formed into parallel light by the parabolic mirror 22, and the parallel light is collected to the infrared detector 21 by the parabolic mirror 23.

Figure 3B:
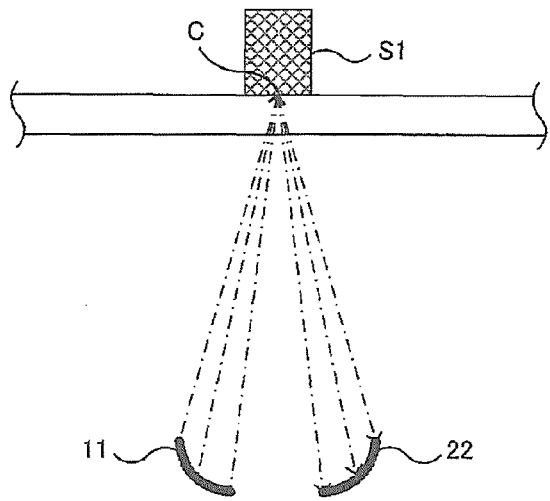

In addition, as shown in FIG. 3B, for a first resin piece S1 greater in height than the resin piece S having a predetermined shape, the light collected by the parabolic mirror 11 passes through the gap 33 between the lower surfaces of the conveying plates 31 and 32 so as to be irradiated at the measurement point C on the lower surface of the first resin piece S1. The light reflected by the measurement point C on the lower surface of the first resin piece S1 again passes through the gap 33 between the lower surfaces of the conveying plates 31 and 32 so as to be formed into parallel light by the parabolic mirror 22, and the parallel light is collected to the infrared detector 21 by the parabolic mirror 23.

Figure 3C:
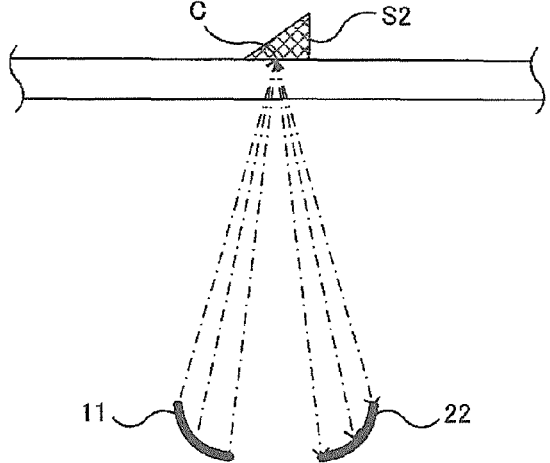
Figure 4:
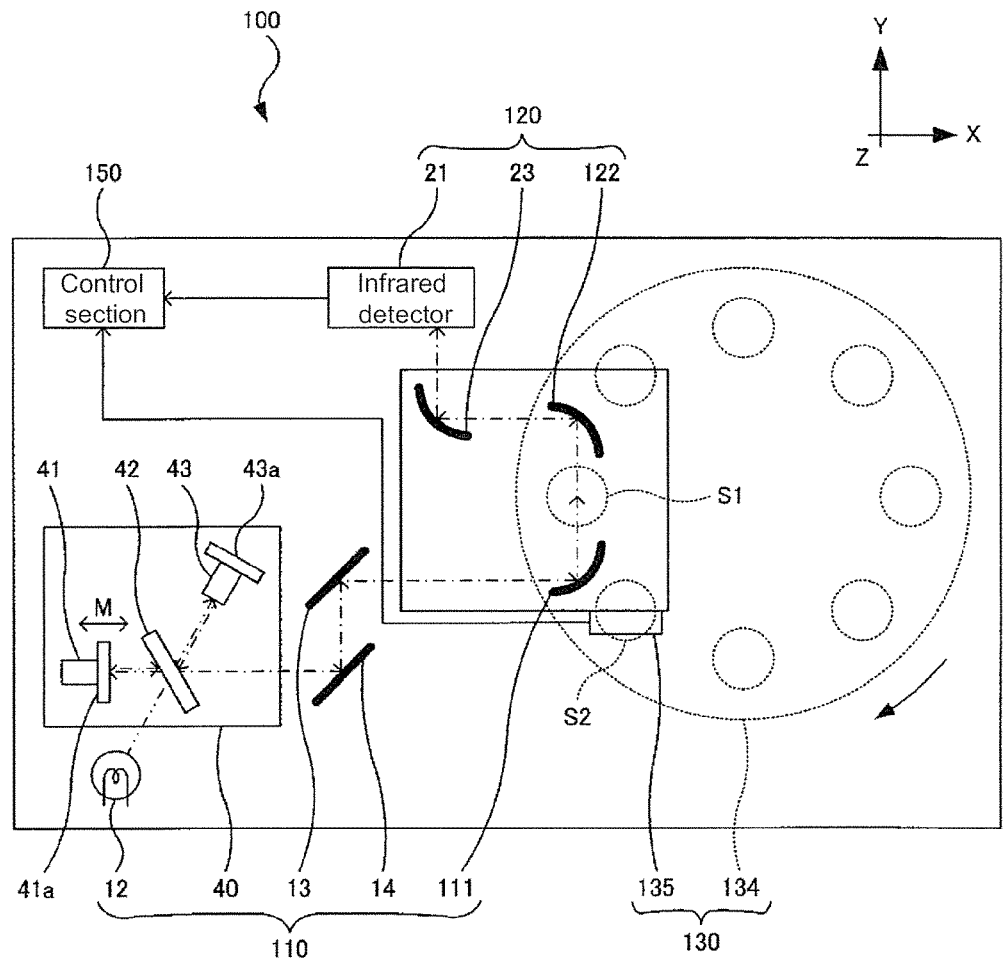
FIG. 4 is a plan view illustrating a configuration of a conventional FTIR.
Figure 5:
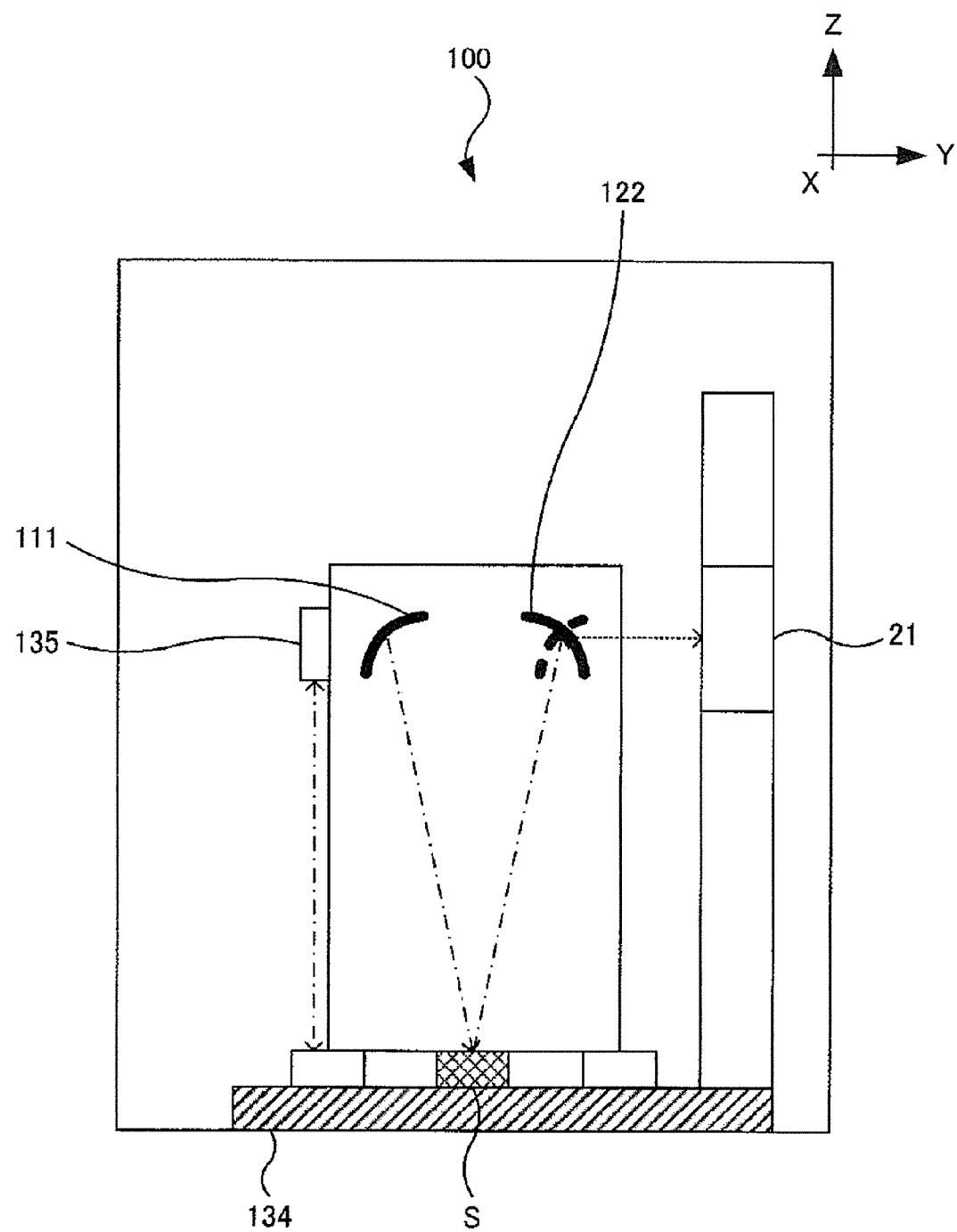
FIG. 5 is a side view of the FTIR shown in FIG. 4.
Figure 6A:
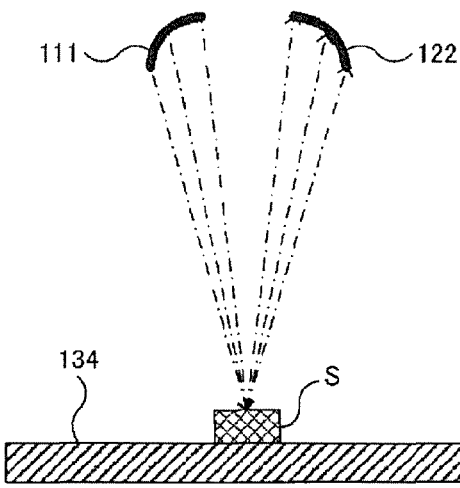
FIGS. 6A to 6C are side views each illustrating a sample arranged in a sample arrangement section of the FTIR shown in FIG. 4.
Figure 6B:
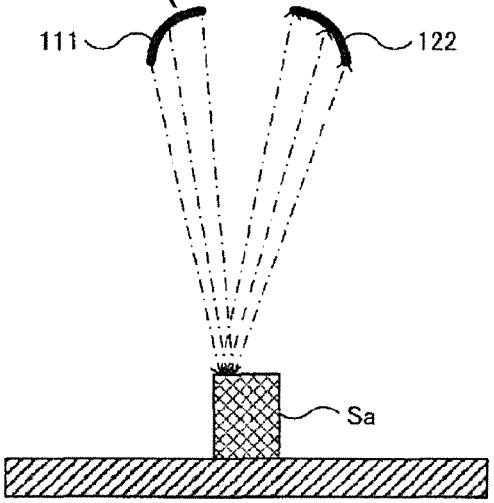
Figure 6C:
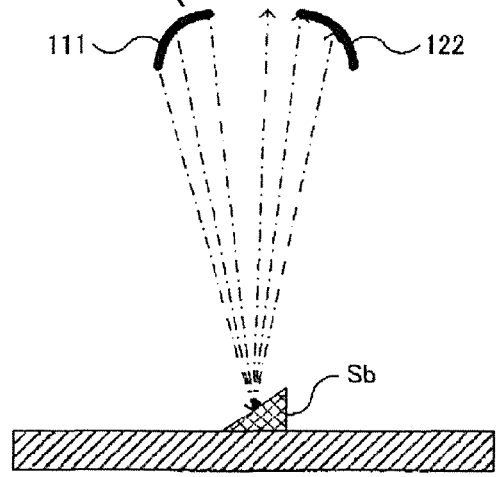

Furthermore, as shown in FIG. 3C, in a second resin piece S2 having non-parallel upper and lower surfaces, the light collected by the parabolic mirror 11 passes through the gap 33 between the lower surfaces of the conveying plates 31 and 32 so as to be irradiated at the measurement point C on the lower surface of the second resin piece S2. The light reflected by the measurement point C on the lower surface of the second resin piece S2 again passes through the gap 33 between the lower surfaces of the conveying plates 31 and 32 so as to be formed into parallel light by the parabolic mirror 22, and the parallel light is collected to the infrared detector 21 by the parabolic mirror 23.

Furthermore, as shown in FIG. 3C, in a resin piece S2 having non-parallel upper and lower surfaces, the light collected by the parabolic mirror 11 passes through the gap 33 between the lower surfaces of the conveying plates 31 and 32 so as to be irradiated at the measurement point C on the lower surface of the resin piece S2. The light reflected by the measurement point C on the lower surface of the resin piece S2 again passes through the gap 33 between the lower surfaces of the conveying plates 31 and 32 so as to be formed into parallel light by the parabolic mirror 22, and the parallel light is collected to the infrared detector 21 by the parabolic mirror 23.

According to such a sample arrangement section 30, after a plurality of resin pieces S (the first resin piece S1, the second resin piece S2, . . . ) are placed on the two conveying plates 31 and 32, the two conveying plates 31 and 32 are moved in the predetermined direction by the driving mechanism, thereby sequentially arranging the resin pieces S one by one in predetermined positions in a manner that the first resin piece S1 is arranged in its predetermined position, then the second resin piece S2 is arranged in its predetermined position, and so on. Moreover, when the resin pieces S are not present in the predetermined positions, the light collected by the parabolic mirror 11 passes through the gap 33 between the lower surfaces of the conveying plates 31 and 32, and continues to travel straight ahead, and thus will not reach the infrared detector 21.

The control section 50 includes: a light intensity information obtaining part that continuously emits infrared light to obtain the light intensity information from the infrared detector 21, a sample measurement part that produces an absorption spectrum of the first resin piece S1 or an absorption spectrum of the second resin piece S2 based on the obtained light intensity information, and a resin type determining part that uses each absorption spectrum to determine the type of each resin.

Based on a light intensity change per period of time, the sample measurement part determines whether the resin pieces S are in the predetermined positions, correlates each resin piece S to each piece of absorption spectrum information, and controls production of the absorption spectrum of the first resin piece S1 or the second resin piece S2.

The functions of the sample measurement part are specifically described. If the light intensity information is less than a predetermined light intensity threshold value, it is determined that the first resin piece S1 is not arranged in the predetermined position. When the light intensity information becomes equal to or greater than the predetermined light intensity threshold value, it is determined that the first resin piece S1 is arranged in the predetermined position; when the light intensity information becomes less than the predetermined light intensity threshold value, it is determined that the first resin piece S1 is excluded from the predetermined position. Based on the light intensity information (absorption spectrum information) obtained when it is determined that the first resin piece S1 is arranged in the predetermined position, the absorption spectrum of the first resin piece S1 is produced.

In addition, if the light intensity information is less than a predetermined light intensity threshold value, it is determined that the second resin piece S2 is not arranged in the predetermined position. When the light intensity information becomes equal to or greater than the predetermined light intensity threshold value, it is determined that the second resin piece S2 is arranged in the predetermined position; when the light intensity information becomes less than the predetermined light intensity threshold value, it is determined that the second resin piece S2 is excluded from the predetermined position. Based on the light intensity information (absorption spectrum information) obtained when it is determined that the second resin piece S2 is arranged in the predetermined position, the absorption spectrum of the second resin piece S2 is produced. In this way, the absorption spectrum of the resin piece S is produced.

Moreover, if a plurality of pieces of light intensity information are obtained when it is determined that the resin piece S is arranged in the predetermined position and the resin piece S has a low movement speed, the absorption spectrum of the resin piece S may be produced based on integrated light intensity information. In addition, in a case where a plurality of resin pieces S are connected with each other to reach the predetermined positions, if the light intensity or the absorption spectrum obviously changes midway, it can be judged that the resin pieces S include not only one material.

The resin type determining part determines, e.g., presence or absence of a CN functional group-derived peak in the absorption spectrum of the resin piece S, thereby controlling determination of the type of resin of the resin piece S, so as to determine whether the resin piece S is ABS resin. In addition, an absorption spectrum obtained by Kramers-Kronig conversion can also be used in this determination to determine the presence or absence of a peak at a plurality of specific frequencies so as to determine the type of resin.

As described above, according to the resin identification device 1 of the invention, accurate measurement can be achieved regardless of the shape or size of the resin piece S that serves as the sample. In addition, when the resin piece S is not present in a predetermined position, since the infrared light that has passed through the gap 33 cannot be reflected by the conveying plates 31 and 32, the difference in light intensity information between when the resin piece S is present and when the resin piece S is not present in the predetermined position will be obvious. Accordingly, without provision of a laser sensor or the like for detecting the arrangement of the resin piece S into the predetermined position, the light intensity information from the first resin piece S1 and the light intensity information from the second resin piece S2 can be identified by the control section 50.

OTHER EMBODIMENTS

In the aforesaid resin identification device 1, the sample arrangement section 30 is configured to include two conveying plates (sample placing plates) 31 and 32 and the driving mechanism. However, the resin identification device may also be configured to include a disc-shaped table having a peripheral part and a central part in which an opening is formed, and a driving mechanism. That is, the sample arrangement section of the invention may have any configuration as long as it is capable of irradiating infrared light to a lower surface of a sample and detecting light intensity information of the infrared light reflected from the lower surface of the sample.

The invention can be suitably utilized in a resin identification device or the like.

What is claimed is:

1. A resin identification device comprising:
   an infrared spectrophotometer comprising:
      an infrared light source section, configured to irradiate an infrared light to a resin sample;
      an infrared light detection section, configured to detect a light intensity information of the infrared light reflected from the resin sample; and
      a control section, configured to obtain the light intensity information; and
   a sample placing plate provided with an opening, wherein
   the resin sample is placed in a predetermined position on the sample placing plate in a manner that a portion of a bottom surface of the resin sample is in contact with the sample placing plate and a portion of the opening is blocked off by the resin sample,
   the infrared light reaches the bottom surface of the resin sample and is reflected by the bottom surface when the infrared light source section irradiates the infrared light to the resin sample, the infrared light passes through the opening and is not reflected when the infrared light source section irradiates the infrared light to the opening, and
   the infrared light detection section detects the light intensity information of the infrared light reflected by the bottom surface of the resin sample.

2. The resin identification device according to claim 1, wherein the infrared light source section comprises a condensing mirror, and is configured to irradiate the infrared light from the condensing mirror to a measurement point on the bottom surface of the resin sample; and
   the infrared light detection section comprises a condensing mirror, and is configured to collect the infrared light reflected by the measurement point on the bottom surface of the resin sample to a detector so as to obtain reflected light intensity of the resin sample.

3. The resin identification device according to claim 1, wherein the sample placing plate is configured to be movable in a predetermined direction, and when the resin sample is continuously or intermittently placed on the sample placing plate, the control section is configured to control to emit infrared light continuously to obtain the light intensity information so as to determine whether the resin sample is in the predetermined position from a light intensity change per period of time.

4. The resin identification device according to claim 1, wherein the control section is configured to control to emit infrared light continuously to obtain the light intensity information so as to determine whether the resin sample is in predetermined position from a light intensity change per period of time, and correlates the resin sample arranged in the predetermined position at a predetermined time to one of absorption spectrum information.

* * * * *